May 13, 1930.  A. E. FINLEY  1,758,568
COMBINED CONTAINER AND TESTING BASE FOR ELECTRICAL INSTRUMENTS
Filed April 2, 1926
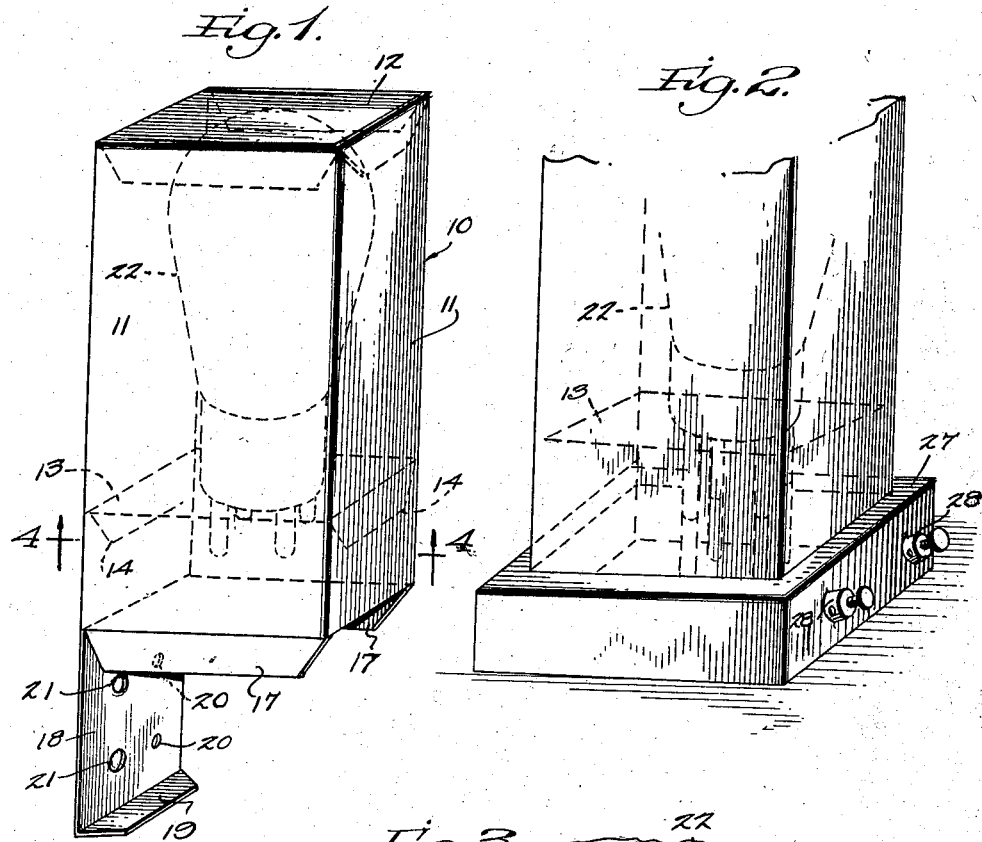
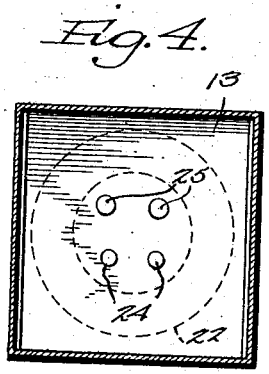
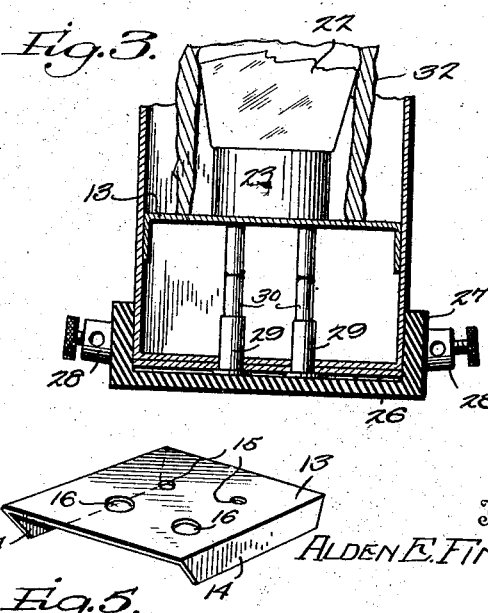
Inventor
ALDEN E. FINLEY
By
Attorney Patented May 13, 1930

1,758,568

UNITED STATES PATENT OFFICE

ALDEN E. FINLEY, OF GROTON, CONNECTICUT

COMBINED CONTAINER AND TESTING BASE FOR ELECTRICAL INSTRUMENTS

Application filed April 2, 1926. Serial No. 99,350.

This invention relates to a combined container and testing base for electrical instruments.

An important object of the invention is to provide an improved container for electrical instruments such as electron discharge tubes employed in radio receiving sets.

A further object is to provide a novel container for electrical instruments having cushion supporting means therein for supporting the instruments whereby they may be safely shipped.

A further object is to provide a carton or container for radio tubes provided with means for supporting the tube above the bottom of the carton, said means being provided with openings through which the prongs of the tube are adapted to project whereby the tube may be tested for its electrical characteristics and values.

A further object is to provide a container or carton of the above mentioned character in combination with the testing base whereby the electrical characteristics and values of the radio tubes or other instrument may be determined without removing the instrument from the carton.

A further object is to provide a carton having a sub-bottom adapted to support the radio tube and provided with openings through which the prongs thereof are adapted to project, the carton being further provided with a bottom having openings therein corresponding in arrangement to the openings in the sub-bottom to provide access to the contacts or prongs of the tube to permit it to be tested.

A further object is to provide a carton of the character just mentioned and a testing base therefor, the base being provided with contacts corresponding in position to the contacts or prongs of the tube and adapted to be inserted through the openings in the bottom of the carton to contact with the prongs of the tube.

A further object is to provide a carton of the above mentioned character which may be sealed at the factory and whereby the tubes may be tested without breaking the seals of the cartons.

Other objects and advantages of the invention will become apparent during the course of the following description.

In the drawings I have shown one embodiment of the invention. In this showing:

Figure 1 is a perspective view of the carton with the bottom thereof opened,

Figure 2 is a similar view showing the carton in testing position,

Figure 3 is a vertical sectional view through the lower end of the carton and testing base, parts being shown in elevation, Figure 4 is a section on line 4—4 of Figure 1, Figure 5 is a detail perspective view of the sub-base, and, Figure 6 is a detail sectional view through one form of testing base contact.

Referring to the drawings, the numeral 10 designates a carton preferably formed of pasteboard or the like having sides 11 and a top 12 of the usual type. The carton is substantially square in cross section, as shown in Figure 4, and is provided at a point spaced from its lower end with a sub-bottom or support 13 having integral flaps 14 which may be glued or otherwise secured against the inner faces of the sides of the carton to properly secure the sub-base in position. The sub-bottom or support is provided with a pair of openings 15 arranged to one side of the center thereof and a pair of slightly larger openings arranged toward the opposite side for a purpose to be described. Two sides of the carton are provided with integral flaps 17, and the bottom of the carton is adapted to be closed by a bottom 18 formed integral with one of the sides of the carton. The bottom 18 is provided with a flap 19 adapted to frictionally engage against one of the side walls of the carton when the bottom is in closed position, as will be apparent. The bottom 18 is provided to one side of the center thereof with a pair of openings 20 corresponding in size and position to the openings 15, and is further provided with a second pair of openings 21 corresponding in size and position to the openings 16.

The carton is adapted to contain an electrical instrument such as an electron discharge tube 22 having a base 23. Such tubes are now made with standard bases 23 having a pair of relatively small prongs 24 and a pair of relatively large prongs 25 projecting from the bottom thereof. Tubes are now standardized to permit the use of a single type and size of base in connection with any type of tube. The openings in the sub-bottom are made to correspond to the prongs of the tube whereby the latter snugly fit the openings. As shown in Figure 3, the prongs of the tube terminate a substantial distance above the bottom of the carton. In packing the tubes in the boxes, they are inserted from the upper end thereof, and the top is then closed. The bottom 20 is similarly closed and the top and bottom may be provided with the usual paper seals which are provided for the protection both of the user and manufacturer.

Referring to Figures 2 and 3, the numeral 26 designates a testing base having side walls or flanges 27 to snugly receive the lower end of the carton. The side walls or flanges are provided with binding posts 28 for connection with suitable electron tube testing devices. The base 26 is provided with a plurality of sleeves 29 having plungers 30 extending upwardly therefrom, the plungers normally being urged upwardly by springs 31. The sleeves 29 are, of course, connected to the proper binding posts 28, as will be apparent. The openings 20 and 21 are of different sizes, and the two larger openings correspond in position to the larger prongs 25 of the tubes. It will be apparent, therefore, that the carton may be placed in position on the base 26 and within the flanges 27 thereof in only one position whereby a proper electrical contact will be made with the elements of the tube, as will be apparent.

It is customary to pack tubes in cartons by wrapping them in a protecting medium such as felt paper, corrugated board and the like. Accordingly I prefer to provide a wrapping medium 32 which may be formed of any desired material and preferably covers the sides and top of the tube to prevent injury thereto. The sub-bottom 13, being formed of pasteboard or the like, will possess a certain degree of resiliency, thus providing a resilient support for the tube.

The operation of the device is as follows:

Tubes are tested for their electrical characteristics and values at the factory, and are then placed in the carton in the manner described, the prongs 24 and 25 projecting through the openings 15 and 16 respectively. The protective wrapping obviously will protect the tube against jars from the top and sides of the carton while the sub-bottom 13 forms a resilient support for the tube. Inasmuch as the lower ends of the prongs 24 and 25 are arranged a substantial distance above the bottom of the carton, they will be protected from accidental contact with any sources of electrical current. Purchasers of radio tubes usually desire that the tubes be tested in their presence before they are accepted. When it is desired to test a tube, the lower end of the carton containing the same may be inserted in the testing base, and since the larger openings 21 correspond in position to the larger prongs of the tube, it will be obvious that the carton necessarily can be placed in the base in only the proper position. The characteristics and values of the tubes then may be observed by connecting the binding posts 28 to suitable testing instruments. It will be obvious that the testing base may be formed as a permanent part of the testing instruments if desired. As previously stated. paper seals are employed for sealing the top and bottom of the carton and every purchaser of a tube may buy the tube with the assurance that it is a new tube. The device also forms a protection to the manufacturers of the tubes inasmuch as the seals must be broken to permit the tube to be removed from the box and placed in operation. Obviously, therefore, an unscrupulous purchaser cannot remove and use the tube and return it as being defective if it has been damaged during use. The use of the device reduces the danger of breakage usually incident to the removal, unwrapping and testing of the tubes sold in ordinary pasteboard cartons. It will be apparent that when the carton is placed in the position shown in Figure 3, the lower ends of the tube prongs are adapted to make perfect electrical contact with the plungers 30, the latter being projected upwardly into firm contact with the tube prongs by the springs 31. Obviously, however, the device is not limited to the use of any particular type of testing base contacts.

It is to be understood that the form of the invention herewith shown and described is to be taken as a preferred example of the same and that various changes in the shape, size and arrangement of parts may be resorted to without departing from the spirit of the invention or the scope of the subjoined claim.

I claim:

A container for a radio tube having a plurality of spaced contacts of different sizes projecting from its base, comprising a hollow body having parallel sides and a top and a bottom, and a relatively thin resilient sub-bottom secured within said body above and parallel to said bottom and provided with a plurality of spaced apertures corresponding in size and arrangement to the contacts of the tubes, said body being adapted to receive the tubes in the space between the top thereof and the sub-bottom with the contacts of the tubes projecting through the apertures in said sub-bottom, the bottom of said body having a plurality of spaced apertures corresponding to and alined with the openings in said sub-bottom, and being spaced below the ends of the contacts of the tubes, whereby said contacts are protected against accidental communication with outside electrical means.

In testimony whereof I affix my signature.

ALDEN E. FINLEY.